(12) United States Patent
Newton

(10) Patent No.: US 6,690,363 B2
(45) Date of Patent: Feb. 10, 2004

(54) TOUCH PANEL DISPLAY SYSTEM

(75) Inventor: John Newton, Auckland (NZ)

(73) Assignee: Next Holdings Limited, Auckland (NZ)

( * ) Notice: Subject to any disclaimer, the term of this patent is extended or adjusted under 35 U.S.C. 154(b) by 33 days.

(21) Appl. No.: 09/788,307

(22) Filed: Feb. 16, 2001

(65) Prior Publication Data

US 2002/0075243 A1 Jun. 20, 2002

(30) Foreign Application Priority Data

Jun. 19, 2000 (NZ) ................................................ 505239
Jan. 26, 2001 (NZ) ................................................ 509547

(51) Int. Cl.[7] ................................................ G09G 5/00
(52) U.S. Cl. .................. 345/173; 345/175; 345/179; 178/18.01
(58) Field of Search .................. 345/173, 175, 345/179, 170; 341/13; 178/18.01–20.01

(56) References Cited

U.S. PATENT DOCUMENTS

| | | | | |
|---|---|---|---|---|
| 3,764,813 A | | 10/1973 | Clement et al. ............. | 250/221 |
| 4,243,879 A | | 1/1981 | Carroll et al. .............. | 250/221 |
| 4,459,476 A | | 7/1984 | Weissmueller et al. ...... | 250/221 |
| 4,673,918 A | * | 6/1987 | Adler et al. ................ | 341/13 |
| 4,703,316 A | * | 10/1987 | Sherbeck .................... | 345/175 |
| 4,737,631 A | | 4/1988 | Sasaki et al. ............... | 250/221 |
| 4,766,424 A | * | 8/1988 | Adler et al. ................ | 345/175 |
| 4,851,664 A | | 7/1989 | Rieger ........................ | 250/226 |
| 4,916,308 A | | 4/1990 | Meadows .................... | 250/221 |
| 4,928,094 A | | 5/1990 | Smith ......................... | 340/712 |
| 4,943,806 A | | 7/1990 | Masters et al. .............. | 341/31 |
| 5,025,411 A | | 6/1991 | Tallman et al. ............. | 364/900 |
| 5,105,186 A | | 4/1992 | May ............................ | 340/784 |
| 5,148,015 A | * | 9/1992 | Dolan ......................... | 250/221 |
| 5,162,783 A | | 11/1992 | Moreno ....................... | 340/712 |
| 5,179,369 A | * | 1/1993 | Person et al. ................ | 345/175 |
| 5,196,836 A | * | 3/1993 | Williams ..................... | 345/175 |
| 5,422,494 A | | 6/1995 | West et al. .................. | 250/551 |
| 5,457,289 A | | 10/1995 | Huang et al. ................ | 178/20 |
| 5,591,945 A | | 1/1997 | Kent ........................... | 178/19 |
| 5,698,845 A | | 12/1997 | Kodama et al. ............. | 250/221 |
| 5,739,479 A | | 4/1998 | Davis-Cannon et al. ...... | 178/19 |
| 5,784,054 A | | 7/1998 | Armstrong et al. .......... | 345/177 |
| 5,785,439 A | | 7/1998 | Bowen ........................ | 400/472 |
| 5,804,773 A | | 9/1998 | Wilson et al. ............... | 178/19 |
| 5,940,065 A | | 8/1999 | Babb et al. .................. | 345/178 |
| 5,988,645 A | | 11/1999 | Downing ..................... | 273/348 |
| 5,990,874 A | | 11/1999 | Tsumura et al. ............. | 345/173 |
| 6,076,041 A | | 6/2000 | Watanabe .................... | 701/211 |
| 6,091,406 A | | 7/2000 | Kambara et al. ............ | 345/177 |
| 6,377,228 B1 | | 4/2002 | Jenkin et al. ................ | 345/1.3 |
| 6,429,857 B1 | * | 8/2002 | Masters et al. .............. | 345/175 |

FOREIGN PATENT DOCUMENTS

| | | |
|---|---|---|
| DE | 38 36 429 A1 | 5/1990 |
| GB | 2 263 765 A | 8/1993 |
| WO | WO 89/01677 | 2/1989 |
| WO | WO 01/91043 A2 | 11/2001 |

* cited by examiner

Primary Examiner—Steven Saras
Assistant Examiner—Fritz Alphonse
(74) Attorney, Agent, or Firm—Michael S. Pavento; King & Spalding, LLP (57) ABSTRACT

Emitters and detectors are positioned in proximity to a display screen. Emitters emit energy beams that are diverged across the surface of the display screen. Emitters may be activated/deactivated in sequence, rapid enough to substantially ensure that several energy beams are interrupted by a touch of the display screen. Detectors receive energy beams over a range of angles and generate detection signals upon detecting energy beams. Detection maps are generated based on detection signals. Detection maps indicate which detector should receive an energy beam from which emitter at any point in time. Detections maps are compared to determine that energy beams have been interrupted by a touch. Based on the interrupted energy beams, the location of the touch on the display screen may be determined. The invention serves to reduce the number of emitters and detectors required in a touch panel display system and/or increase the sensitivity and accuracy thereof.

39 Claims, 4 Drawing Sheets

TOUCH PANEL DISPLAY SYSTEM

RELATED APPLICATIONS

The present application claims the benefit of New Zealand Provisional Patent Application Serial No. 505,239, filed with the New Zealand Patent Office on Jun. 19, 2000. The present application also claims the benefit of New Zealand Provisional Patent Application Serial No. 509,547, filed with the New Zealand Patent Office on Jan. 26, 2001.

TECHNICAL FIELD

The present invention relates generally to a touch panel display system that displays information and allows a user to interact with the system by touching on or near the displayed information. More particularly, the present invention relates to a touch panel display system that includes energy emitters for emitting energy beams across the surface of a display screen and detectors for detecting the energy beams, a touch of the display surface causing an interruption of the energy beams.

BACKGROUND OF THE INVENTION

Touch panel display screens allow a user to touch an area of a display screen to supply a command to a computer system associated with the display screen, and hence control the operation of the computer system. A touch panel display screen can provide an intuitive method by which people can easily interact with and control certain functions performed by a computer system. Furthermore, a touch panel display screen can display icon elements representing a keyboard to allow the user to key in text to the associated computer system. An interactive graphical representation of a keyboard eliminates the need to configure the computer system with a physical keyboard and/or other peripheral input devices (e.g., a mouse).

Touch panel display screens can be produced in a range of different types and sizes and can be used in a wide variety of systems, such as kiosks, personal computer systems, portable consumer electronics (e.g., cellular telephones, personal digital assistants or hand held computers, video game devices, etc.) domestic appliances, vehicles information systems (e.g., GPS locators), and industrial equipment or tools. Businesses can use touch panel display screens to display information to potential customers, and to receive feedback or commands from these customers as to what other information they require. Touch panel display systems can also be used to facilitate business and/or consumer transactions. However as compared with regular (non-touch panel) display devices, touch panel display systems are relatively expensive and time consuming to produce and are thus not widely used.

One type of touch panel display system can be constructed by capacitance forming elements formed integrally into the display screen. The user placing a finger or stylus on the display screen will change the capacitance in a particular region of the display screen, thereby indicating to the computer system which area of the display screen has been touched. Other types of touch panel displays transmit energy beams across the face of the display screen. These beams are transmitted in an arrangement of columns and rows. When a finger or stylus interrupts a beam from one column to one row, the computer system can detect which area of the display screen has been touched.

Touch panel display systems that emit beams of energy across the face of the display screen are also highly susceptible to component failure. Such a system will not be able to accurately detect the touch of a user in an area of the display screen that is covered by a failed emitter and/or a failed detector. A failed emitter and/or detector can also result in the system being unable to detect any touches at all in a particular area of the display screen. Furthermore, if the emitters or detectors become dirty, their ability to detect or transmit energy beams will be impaired and will lead to the same problems as if the components had failed.

In touch panel display screens that employ beams of energy transmitted across the face of the display screen, a large number of energy emission and detection components may also be required if the system is to have a reasonable degree of accuracy in determining the location of a touch on the display. The resolution or smallest area within which the system can detect a touch will be determined by the number of energy beams transmitted across the screen, and how close these beams are to one another. If the system needs to detect the touch of a smaller element, such as a stylus, then large numbers of energy beam emitters and detectors will need to be incorporated into the display system. This increased component count will correspondingly increase the cost of manufacturing the display.

Accordingly, there remains a need for a touch panel display system that has a reduced susceptibility to component failure or dirt build-up on components and which also reduces the number of components required to implement the display system. There is a further need for an improved touch panel display system having reduced susceptibility to component failure or dirt build-up that may be incorporated into any type of system employing a display device. There is a yet a further need for an improved touch panel display system that may be retrofitted to an existing non-touch panel display device or be provided as an after market product.

SUMMARY OF THE INVENTION

The present invention provides a touch panel display system that allows user interaction therewith through a touch panel display screen. Preferably, although optionally, the touch panel display system of the present invention may be designed to include a minimal number of components, so as to reduce the system's susceptibility to inaccuracies due to component failures or dirty components. Those skilled in the art should appreciate that the present invention may be used in conjunction with any size touch panel display screen, e.g., from centimeters across upwards of several meters wide if desired. The present invention may also be implemented with numerous different types of display screen technology.

According to one aspect of the present invention there is provided a touch panel display system which includes at least one display surface, a plurality of energy emitters, and a plurality of detectors, whereby said plurality of detectors are adapted to receive energy emitted from said energy emitters over a range of angles. According to another aspect of the present invention there is provided a method of operating a touch panel display system substantially as described above, characterised by the steps of: displaying an image inviting a command from a user, emitting energy from at least one energy emitter, and detecting the energy emitted from said at least one emitter using a detector adapted to detect said emitted energy over a range of angles, and detecting an interruption of said energy by the user, and determining the area or location on the display surface adjacent to where the user interrupted the energy emitted by said at least one energy emitter.

According to another aspect of the present invention there is provided a method of operating a touch panel display system substantially as described above, characterised by the steps of: displaying an image inviting a command from a user, and emitting energy from at least one energy emitter, and detecting the energy emitted from said at least one emitter using a detector adapted to detect said emitted energy over a range of angles, and detecting the interruption by the user of at least two pairs of intersecting energy beams, and calculating the angle of intersection between each of the pairs of intersecting energy beams, and determining the point of intersection of each of the pairs of intersecting energy beams, and determining the area or location on the display surface adjacent to where the user interrupted the said pairs of intersecting beams using the intersection angle and intersection point of each of the pairs of intersecting energy beams.

Further aspects of the present invention will become apparent from the following description and with reference to the accompanying drawings.

DETAILED DESCRIPTION OF EXEMPLARY EMBODIMENTS OF THE INVENTION

The present invention provides a touch panel display system that is adapted to detect user feedback commands using a reduced number of components. A touch panel display system of the present invention may employ one or more emitters that are adapted to emit beams of energy to be channelled across the face of the touch panel display screen. The energy beams emitted by the emitters may be invisible to the human eye and may be of a power or frequency that will not cause health problems in a user. A touch panel display system may also include one or more detectors that are adapted to detect and receive the energy beams generated by the emitters. Those skilled in the art should appreciate that the type of detector involved will be determined by the type of energy emitted by each of the energy emitters. Examples of energy types that may be used in the present invention include, but are not limited to, infrared, visible light, microwave radiation, and acoustic energy.

A touch panel display system of the present invention includes at least one touch panel display screen and any other hardware and/or software components necessary for detecting and calculating the location of a touch thereon. A touch panel display screen may be adapted to display information in the form of static images, video images, text or any other type of graphics. The information displayed by a touch panel display screen may be used to inform a user of the system and/or form part of a user interface. The user may interact with the user interface to instruct the system to perform a function or task. For example, in one embodiment the touch panel display screen may be used to display advertising material to a user and may also display images to assist in the completion of a financial transaction.

User feedback commands can be provided by way of the user touching with a stylus, finger or other pointing device, a selected area of the touch panel display screen that indicates a desired function or portion of the displayed information. A finger, stylus or other pointing device placed on or adjacent to the touch panel display screen will interrupt the energy beams emitted by the emitters. In response to detecting the interruption of the energy beams, the detectors may generate signals from which the touch panel display system is able to calculate the location of the touch on the touch panel display screen.

In accordance with the present invention, the detectors used to create the touch panel display surface are adapted to detect energy beams over a range of angles. By employing detectors that can detect energy beams over a range of angles, the present invention eliminates the need to provide a horizontal/vertical grid of emitters and detectors having a one-to-one ratio of detectors to emitters. Thus, a touch panel display system of the present invention may be constructed using fewer detectors and/or emitters, without sacrificing sensitivity or accuracy. A reduced number of detectors and/or emitters may reduce the overall costs of the touch panel display system and its susceptibility to failure and dirt build-up.

Figure 1:
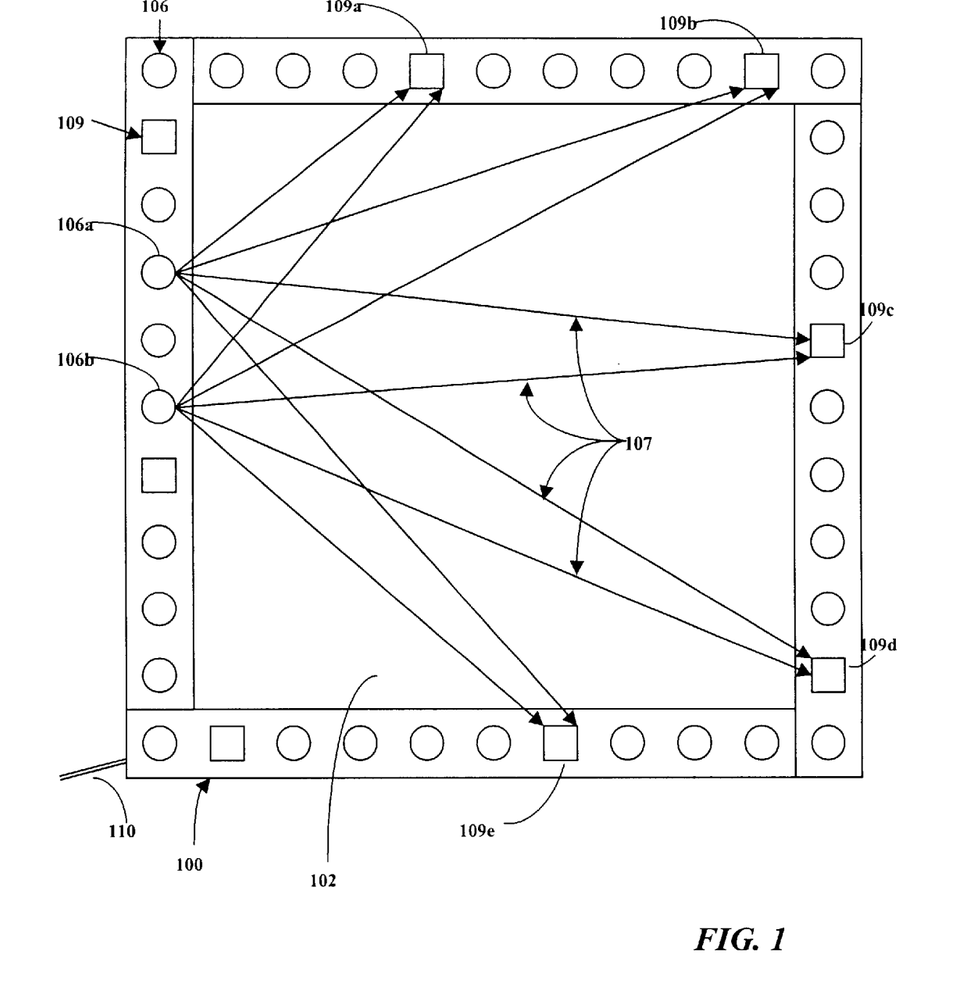
FIG. 1 is a block diagram illustrating a top schematic view of a touch panel display system implemented in accordance with an exemplary embodiment of the present invention.

The following description will hereinafter refer to the drawing, in which like numerals indicate like elements throughout the several figures. FIG. 1 is a block diagram illustrating a top schematic view of a touch panel display screen 100 in accordance with an exemplary embodiment of the present invention. A touch panel display screen 100 comprises a display screen 102 configured with hardware and/possibly software components for detecting a touch provided by a user. The display screen 102 may be, for example, a liquid crystal display ("LCD") screen. Those skilled in the art will appreciate, however, that any type of display screen may be used in conjunction with the present invention. By way of example only, other types of display screens that may be used in conjunction with the present invention include cathode ray technology, polysilicon thin film transistor ("TFT"), super twisted nematic ("STN"), twist nematic ("TN"), plasma display panels ("PDP"), or electroluminescence display technology. In addition, vacuum fluorescent displays, field emission displays, digital micro meter devices or light emitting diodes display technology may also be used. The applicants also consider that plasma addressed liquid crystal displays, anti ferroelectric liquid crystal displays, and also ferroelectric liquid crystal displays can all also be used to provide a display screen in conjunction with the present invention.

The display screen 102 may be a component of any number of different types of computing devices. This display screen 102 may form part of, for example, a laptop computer or a wireless application protocol enabled cellular or digital phone display. A wide number and range of applications are envisioned for the present invention and discussion of particular applications throughout this specification should in no way be seen as limiting. A display screen 102 may also be a surface for mounting a graphic, such as a poster, bill or other static image. Such an embodiment may be used in simple applications, where the information provided to the user remains constant over certain periods of time. For example, in an exemplary embodiment, a static image (e.g., a poster or other signage) associated with a taxi company may be displayed on the display screen 102 and the user may touch the display screen 102 in order to generate a request for a taxi pick-up.

In a preferred embodiment the touch panel display system of the present invention may include one display screen 102. One single display screen 102 may be adequate for most applications of the present invention, where existing computer technology can be used to control the images or graphics that are displayed on different portions of the display screen 102. However, those skilled in the art should appreciate that any number of display screens may be used in conjunction with the present invention, and reference to a single display screen throughout this specification should in no way be seen as limiting. Furthermore, a display screen 102 can be described as being a standard rectangular or square display screen commonly used in existing computer systems, but again this should in no way be seen as limiting. The present invention may be adapted for implementation with a display screen 102 of any shape or configuration.

A display screen 102 of the present invention may be surrounded by a plurality of emitters 106, such as infrared emitters, and a plurality of detectors 109, such as infrared detectors. Those skilled in the art will appreciate that infrared radiation can be emitted at low power or low energy in a focused linear beam that is invisible to normal human vision. Infrared emitters and detectors are well known in the art and can be purchased and installed within a touch panel display screen 100 of the present invention at relatively low cost. However, it should be appreciated that other forms of energy may be used in conjunction with the present invention and reference to infrared throughout this specification should in no way be seen as limiting. For example, in other embodiments, visible light, microwave energy or even acoustic waves may be potentially be emitted and detected in accordance with the present invention.

A touch panel display screen 100 of the present invention may include at least one energy emitter 106 that is adapted to emit beams of energy to be channelled across the face of the display screen 102. Preferably, a touch panel display screen 100 of the present invention includes at least two emitters 106 that emit intersecting energy beams, so that a position at which both energy beams are interrupted can be calculated to determine the location at which user touched the display screen. By having each emitter 106 transmit a beam of energy over different parts or areas of the display screen 102 the number of separate emitters 106 that need to be incorporated into the touch panel display screen 100 are substantially reduced compared to prior art touch panel designs.

Each emitter 106 may be adapted to emit a single energy beam that diverges out from the location of the emitter 106 across an area of the display screen 102. For the sake of clarity, FIG. 1 shows a number of ray lines 107 of the diverging beams emitted by two of the emitters 106a and 106b. Each emitter 106 may be adapted to diverge an emitted energy beam to cover a particular area of the display screen 102, so as to ensure that each energy beam can be detected by more than one detector 109 positioned around the edges of the display screen 102.

The touch panel display screen 100 of the present invention also includes at least one detector 109 adapted to receive and detect an energy beam generated by an emitter 106. A detector 109 in accordance with the present invention is adapted to receive and detect a ray 107 of an energy beam that is directed towards it at an incident angle. Accordingly, a detector 109 may be capable of receiving energy beams transmitted to it over a range of angles, as opposed to merely receiving energy beams transmitted directly at it or at 90° to the edge of the display screen 102 on which it is mounted. In a preferred embodiment, a detector 109 may be able to detect an energy beam transmitted to it over a range of angles from zero to 180°. Those skilled in the art should appreciate that as the angle at which a beam strikes a detector 109 moves away from 90° relative to the surface on which the detector 109 is mounted, the strength or power of the energy beam involved would need to increase to ensure that the beam is detected.

Preferably, a number of detectors 109 are arranged or positioned around the edges of the display screen 102 in such a manner as to ensure that all the energy beams generated by emitters 106 can be received and detected by the detectors 109. The actual number and positioning of the detectors 109 may be dictated by the geometry of the display screen 102, the angles at which each detector 109 can receive an energy beam, and the number of emitters 106 positioned around each side of the display screen 102. Each detector 109 may be used to receive and detect energy beams transmitted by a number of different emitters 106, thereby reducing the number of components that are required to detect all energy beams generated by the emitters 106. In an exemplary embodiment each side of the display screen 102 may include, or have located adjacent to it, two detectors 109.

The emitters 106 may be activated according to a particular cycle. For example, each of the emitters 106 positioned around the edge of the display screen 102 may be activated in a relatively rapid sequence. Activating the emitters 106 in a relatively rapid sequence help to ensure that a single touch by a user on or adjacent to the display screen 102 will interrupt the energy beams emitted by several different emitters 106, where each of the interrupted energy beams are emitted at different times. Cyclical activation of the emitters 106 can be used to either increase the sensitivity or resolution of the touch panel display system, or to potentially reduce the number of emitters 106 required to accurately detect the user's touch on the display screen 102.

Each emitter 106 may be configured to emit an energy beam to several detectors 109 at a set time. Detectors 109 incorporated into the present invention may then be used to build a detection map indicating which detectors 109 should be receiving energy beams from particular emitters 106 at any point in time. This configuration of both the emitters 106 and detectors 109 can be used to either substantially reduce the number of components used to implement a touch panel display system without compromising its accuracy, or alternatively may be used to improve the resolution or accuracy of such a touch panel display system. The activation of each of the emitters 106 may be timed so that only a limited number of emitters 106 emit energy beams across the display screen 102 at one particular point in time.

As mentioned, the emitters 106 and detectors 109 may be configured such that a finger or stylus placed on or adjacent to the display screen 102 will interrupt two or more of the rays 107 with the interruption of these rays being detected by one or more of the detectors 109. Each detector 109 may be connected via a cable or wiring harness 110 to a computing device (see FIG. 2) which may execute one or more software program modules for controlling the emitters 106 and detectors 109, calculating the position of a user's touch on the display screen 102, and controlling the display of information on the display screen 102. Based on the signals supplied from each of the detectors 109, the computing device may be configured to determine the location of the display screen 102 that was touched and hence which portion of the displayed information a user of the system was attempting to interact with. In response to determining the portion of the displayed information that the user was attempting to interact with, the computing device may, for example, be configured to supply additional information to the user or receive information from the user.

Figure 2:
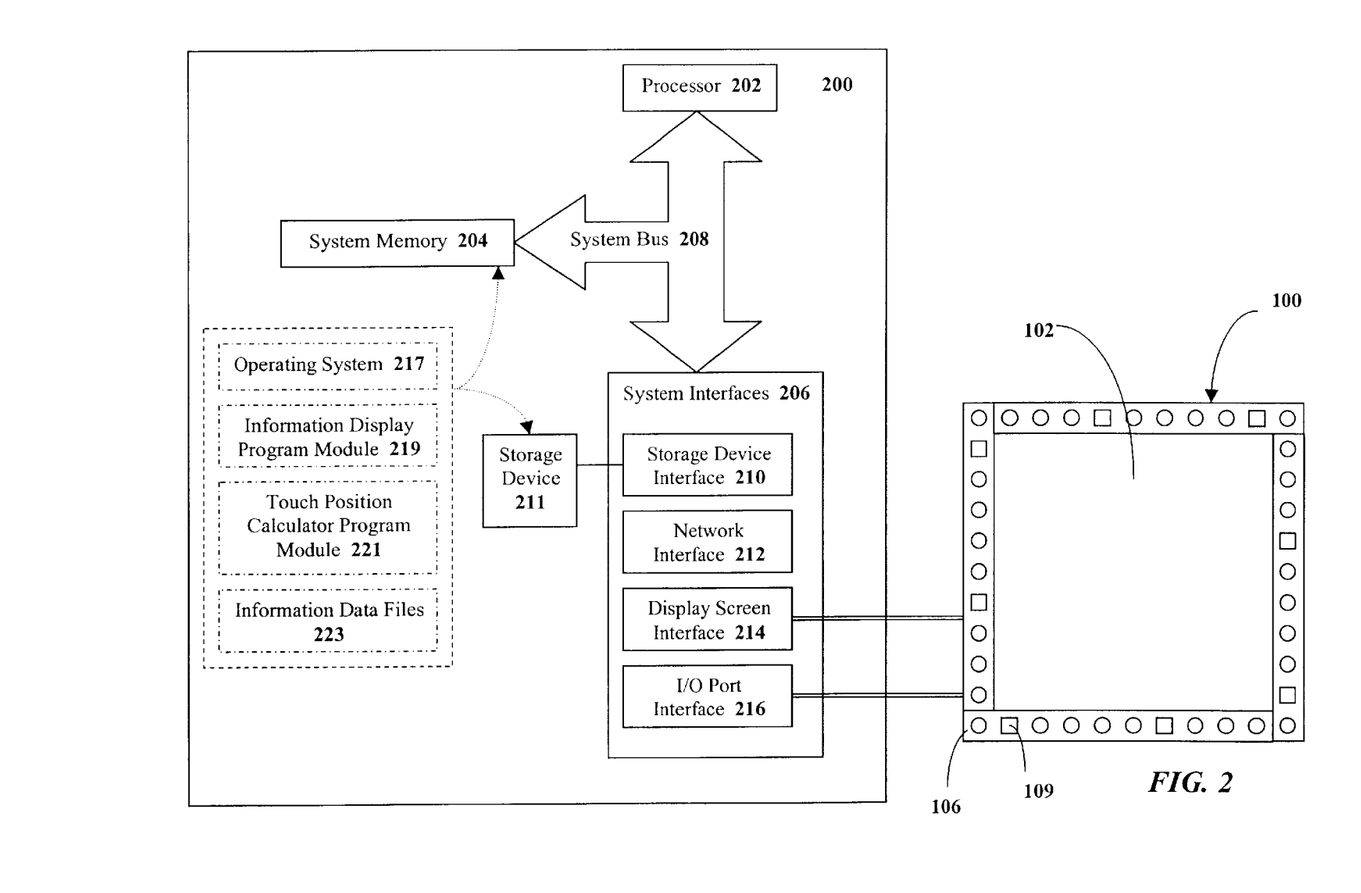
FIG. 2 is a block diagram illustrating a touch panel display system in accordance with an exemplary embodiment of the present invention.

FIG. 2 is a block diagram illustrating an exemplary touch panel display system in accordance with an exemplary embodiment of the present invention. The touch panel display system comprises a computing device 200 functionally coupled to a touch panel display screen 100. The computing device 200 used in conjunction with the present invention may be any type of processor-driven device 200, such as a personal computer, a laptop computer, a handheld computer, a personal digital assistant (PDA), a digital and/or cellular telephone, a pager, a video game device, etc. These and other types of processor-driven devices will be apparent to one of ordinary skill in the art. As used herein, the term "processor" is meant to refer to any type of programmable logic device, including a microprocessor and any other type of similar device.

The computing device 200 may include, for example, a processor 202 a system memory 204 and various system interfaces 206. The processor 202, system memory 204 and system interfaces 206 may be functionally connected via a system bus 208. The system interfaces enable the processor 202 to communicate with peripheral devices. For example, a storage interface 210 provides an interface between the processor 202 and a storage device 211 (removable and/or non-removable), such as a disk drive. A network interface 212 may optionally be provided as an interface between the processor 202 and a network communications device (not shown), so that the computing device 200 may be connected to a network.

A display screen interface 214 provides an interface between the processor 202 and a display screen 102. Input/Output ("I/O") port interfaces 216 may be provided as interfaces between the processor 202 and various input devices and/or various output devices. For example, the detectors 109 of the touch panel display screen 100 may be connected to the computing device 200 by way of an input port and may provide input to the processor 202 via an input port interface. Similarly, the emitters 106 of the touch panel display screen 100 may be connected to the computing device 200 by way of an output port and may receive output from the processor 202 via an output port interface.

A number of program modules may be stored in the system memory 204 and any other computer-readable medium associated with a storage device 211 (e.g., a hard disk drive), including an operating system 217. Certain aspects of the present invention may be embodied in an "Information Display" program module 219 comprising computer-executable instructions of for displaying images or other information on a display screen 102. Other aspect of the present invention may be embodied in a "Touch Panel Control" program module 221 for controlling the emitters 106 and detectors 109 of a touch panel display screen 100 and for calculating touch positions on the display screen 102 based on signals received from the detectors 109. Furthermore, the images or other information displayed by the "Information Display" program module 219 may be stored in one or more information data files 223 stored on any computer readable medium associated with the computing device 200.

The processor 202, controlled by the operating system, may be configured to execute the computer-executable instructions of the "Information Display" program module 215, the "Touch Panel Control" program module 217, and/or other program modules in order to perform or facilitate the methods of the present invention. For example, the processor 202 may execute computer-executable instructions for determining or receiving information from each detector 109 when a beam of energy is received. The processor 202 may also be adapted to determine when the user has attempted to touch an element or graphic displayed on the display screen 102. In one embodiment, the processor 202 may be configured to determine which of the energy beams transmitted across the face of the display screen 102 are interrupted by the user's finger, pen, stylus or other element.

For example, the processor 202 may monitor activation of the emitters 106 and energy beam detection signals generated by the detectors 109 in order to build a profile or "detection map" indicating which detectors 109 receive energy beams at any particular time. One or more detection maps may be stored in the system memory 204 or on any other computer-readable medium associated with the computing device 200. When a user touches on or in proximity to the display screen 102, the transmission of an energy beam (preferably two or more energy beams) will be interrupted for a short period of time. When the interruption of an energy beam occurs, a detector 109 will not detect the energy beam as expected and will not generate a detection signal. The processor 202 may determine the absence of an expected detection signal by comparing a detection map created at the time of the touch to one or more detection maps created when the display screen 102 was not being touched. Based on information regarding the interrupted energy beam(s), the processor 202 may be configured to calculate or determine the location of the user's touch on or in proximity to the display screen 102. Exemplary methods for calculating or determining the location of a user's touch on or in proximity to the display screen 102 will be described below with reference to FIG. 3 and FIG. 4.

The use of detection maps and the cyclical divergence of energy beams across the display screen 102 improves the tolerance of the touch panel display system to component failure or dirt build-up on emitters 106 or detectors 109. As multiple energy beams are diverged across the surface of the display screen 102 over time, detection maps may be created which will take into account any failed or malfunctioning detectors or emitters. By examining an average of several previously stored detection maps, the processor 202 may determine that a continued absence of a detection signal by one or more detectors is not the result of temporary energy bean interruption caused by a touch. Thus, exemplary embodiments of the present invention may have an inherent robustness and redundancy that will allow the touch panel display system to continue to function effectively even of if one or more emitters 106 or detectors 109 fails.

Those skilled in the art should appreciate that the "Information Display" program module 215 and the "Touch Panel Control" program module 217 are described herein by way of illustration only. Functionality of the present invention may be provided by way of any type and number of program modules, created in any programming language, which may or may not be stored locally at the computing device 200. For example, the computing device 200 may comprise a network server, client, or appliance that may be configured for executing program modules (e.g., 215 and 217) that are stored on another network device and/or for controlling a remotely located touch panel display screen 100. Accordingly, the touch panel display screen 100 of the present invention may provide an intuitive control interface for any computing device that can easily detect the position of a display screen 102 that has been touched by a user.

Figure 3:
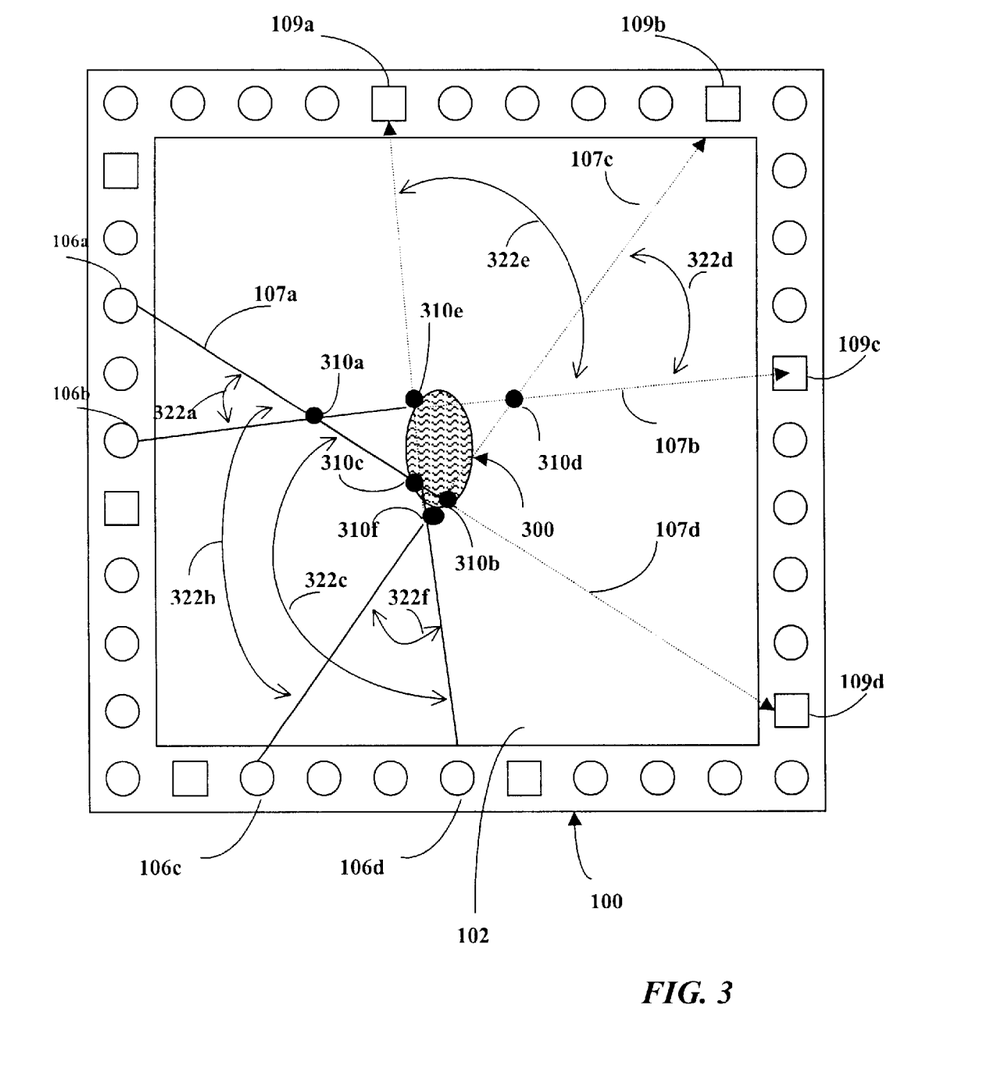
FIG. 3 is a block diagram illustrating the paths across the surface of a touch panel display device in which energy beams in accordance with an exemplary embodiment of the present invention.

FIG. 3 is a block diagram illustrating a touch panel display screen 100 that has been touched by a user. A touch is illustrated by a touch position 300. Ray lines 107 show the paths across the surface of the display screen 102 in which a number of energy beams may travel. In the instance shown, a first emitter 106a is transmitting a first ray 107a across the face of the display screen 102, a second emitter 106b is transmitting a second ray 107b across the face of the display screen 102, a third emitter 106c is transmitting a third ray 107c across the face of the display screen 102 and a fourth emitter 106d is transmitting a fourth ray 107d across the face of the display screen 102. Each of the four rays 107a–d represents a portion of an energy beam that is diverged across the touch screen 102. The energy beams are each interrupted by the user's touch at touch position 300, causing the rays 107a–d to not be detected by the corresponding detectors 109a–d.

By comparing a detection map created at the instant in time of the touch to a stored detection match created when the touch panel display screen 100 is not being touched, a determination may be made as to which beams (represented by rays 107a–d) have been interrupted. Then, all of the interrupted beams may be examined to identify each pair of intersecting beams. As shown in the figure, the first ray 107a intersects the second ray 107b at a first intersection point 310a creating a first angle of intersection 322a, intersects the third ray 107c at a second intersection point 310b creating a second angle of intersection 322b and intersects the fourth ray 107d at a third intersection point 310c creating a third angle of intersection 322c. Similarly, the second ray 107b intersects the third ray 107c at a fourth intersection point 310d creating a fourth angle of intersection 322d and intersects the fourth ray 107d at a fifth intersection point 310e creating a fifth angle of intersection 322e. Also, the third ray 107c intersects the fourth ray 107d at a sixth intersection point 310f creating a sixth angle of intersection 322e.

As can be seen from the figure, the six intersection points 310a–f are located at various distances relative to the touch position 300. The smaller the angle of intersection between two rays, the further from the touch point the intersection point will be. For example, the first intersection point 310 is further from the touch point 300 than the third intersection point 310c because the first angle of intersection 322a between the first ray 107a and the second ray 107b is smaller than the sixth angle of intersection 322f between the third ray 107c and the fourth ray 107d.

The intersection points 310a–f and the corresponding angles of intersection between each pair of intersection rays 107a–d may be used to calculate the position of the touch point 300 on the display screen 102. By way of example only, Cartesian coordinates (X,Y) of each intersection point 310a–f may be determined. The Cartesian coordinates of each intersection point 310a–f may then be multiplied by the corresponding angle of intersection (e.g., expressed in radians). The resulting products may be added together and divided by the sum (e.g., expressed in radians) of all the angles of intersection 322a–f. The result of such a calculation will represent a weighted average location value for the touch point 300. Those skilled in the art will recognize that the above calculation assigns greater weight (i.e., importance) to an intersection point (e.g., 310f) having a larger corresponding angle of intersection (e.g., 322f) because that intersection point (e.g., 310f) will be closer to the touch point 300 than an intersection point (e.g., 310a) having a smaller angle of intersection (e.g., 322a). Additionally, those skilled in the art will appreciate that any linear or non-linear weighting function may be used in accordance with the present invention.

Figure 4:
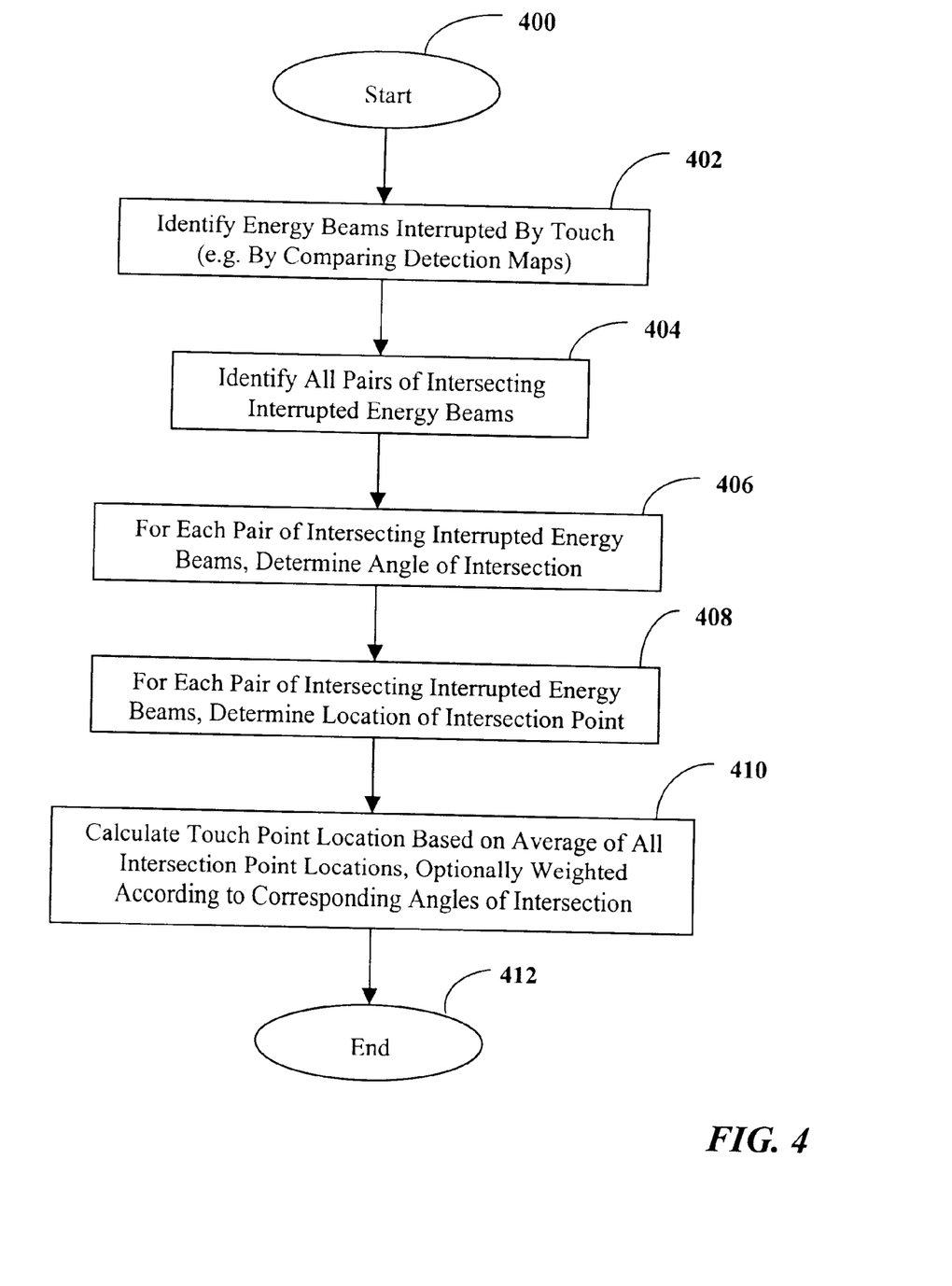
FIG. 4 is a flow chart illustrating an exemplary method for calculating a touch point location on a touch panel display screen in accordance with an exemplary embodiment of the present invention.

FIG. 4 is a flow chart illustrating an exemplary method 400 for calculating the location of a touch on a touch panel display screen 100 in accordance with an exemplary embodiment of the present invention. The method 400 begins at starting block 401, where a user touches a touch panel display screen 100. Next, at step 402, the energy beams interrupted by the user's touch are identified. For example, based on detection signals from detectors 106, a detection map may be created and compared to one or more previously stored detection maps in order to identify the energy beams that are interrupted by the touch. In a preferred embodiment, at least two pairs of energy beams are interrupted by the touch. As mentioned, the emitters 106 of the present invention may be activated such that the energy beams are diverged across the face of the display screen 102 in a cyclical manner. The emitter activation cycle may have a frequency that ensures that a typical touch will cause the interruption of at least two pairs of intersecting energy beams. In other words the emitter activation cycle may be fast enough such that four emitters 106 will transmit an energy beam across the touch screen 102 during the duration of a typical touch. The detection by multiple detectors 109 of "shadows" (i.e., the absence of an energy beam) caused by a touch can be used to determine the location on the display screen 102 where the touch occurred. Those skilled in the art will appreciate that the emitter activation cycle may be varied without departing from the spirit and scope of the present invention.

At step 404, the interrupted energy beams are examined to identify all pairs of intersecting interrupted energy beams. Then, at step 406, the angle of intersection between each pair of intersecting interrupted energy beams is calculated. Next at step 408, the intersection point of each pair of intersecting interrupted energy beams is located. For example, a Cartesian coordinate system may be assigned to the display screen 102 and the coordinates of each intersection point may be determined. At step 410, the location of the touch on the display screen 102 is determined based on an average of the intersection point positions, optionally weighted based on angle of intersection. By way of illustration, each intersection point can be considered to represent a possible location of the touch point on the display screen 102. In the case where a Cartesian coordinate system is employed, the coordinates of each intersection point may be summed together and divided by the total number of intersection points in order to obtain average coordinate values ($X_{average}$, $Y_{average}$). The average coordinate values may provide an adequate estimation of the location of the touch point on the display screen 102.

Optionally, the angle of intersection corresponding to each intersection point may be used to weight the calculation of average intersection point coordinates. For example, the coordinates of each intersection point may be multiplied by the angle of intersection (e.g., expressed in radians) corresponding to that intersection point. Each angle of intersection and intersection point product may be added together and the resulting sum may be divided by a summation of all the angles of intersection (e.g., expressed in radians) to arrive at the coordinated of a weighted average intersection point. The weighted average intersection point may provide a more accurate estimation of the location of the touch point on the display screen 102. Intersecting interrupted energy beams having a small angle of intersection will converge and diverge from one another slowly, which can result in an inaccurate estimation of the location of the touch point. Thus, by using angles of intersection as a weighting factor, intersecting interrupted energy beams having small angles of intersection will have less effect on the estimation of the touch point location, as compared to intersecting interrupted energy beams having relatively large angles of intersection. After the location of the touch point is calculated at step 410, the method ends at step 412.

Those skilled in the art will appreciate that the above-described methods for calculating the location on the display screen 102 of a touch are provided by way of example only and many modifications and variations thereof are possible. For example, in one alternative embodiment, only intersection points having corresponding angles of intersection falling within a particular range of angles (e.g., 45° and 135°) may be considered when determining a weighted average intersection point. All intersection points having corresponding angles of intersection that fall outside the particular range of angles (e.g., less than 45° or greater than and 135°) may be discarded. These and other modifications and variations to the above-described methods, as well as alternate methods for calculating the location of a touch on a display screen 102, are considered to be within the spirit and scope of the present invention.

From the foregoing description of certain exemplary embodiment, it may be seen that the present invention provides many potential advantages over existing prior art systems. Emitters may be provided that are configured to diverge energy beams across a number of different areas of a display screen. Detectors may also be provided that are adapted to receive energy beams over a wide range of angles. Accordingly, the present invention may provide a touch panel display system that may be implemented with a minimal number of components.

Furthermore, the present invention's ability to detect diverging energy beams across the face of a display screen can provide improved resolution, accuracy and resistance to component failures when a sufficient number of emitters and detectors used. By gathering energy beam detection signals from the detectors over time, the present invention may continue to function accurately if one or more components fail, or if any emitters or detectors are covered in dirt or dust.

The present invention may also be used with a wide range of different types of display screens. Any display screen that can display an image to a user can be used in conjunction with a touch panel display system of the present invention. A touch panel display screen of the present invention may be produced in a factory situation where an original display screen is manufactured. Alternatively the touch panel functionality of the present invention may be incorporated into an after-market product that may be adapted to be fitted to an existing display screen already owned by a user. In a retro-fitted embodiment, a processor may be incorporated into a touch panel product and may be interfaced with existing components of the display screen. Alternatively, a retrofitted touch panel system may harness a processor that pre-exists in the existing display screen.

The improved touch panel functionality provided by the present invention gives it the ability to improve on a number of different types of devices that employ display screens. By way of example only and not by way of limitation, devices that may incorporate display screens with which the present invention may be used include: cellular phones, personal digital assistants or hand held computers, lap top computers, telephones, calculators, televisions, standard computers, appliances and tools of all shapes and forms, games machines, security devices, information kiosks, vehicle information systems, medical equipment, testing equipment, and commercial point of sale devices. A touch panel display system of the present invention may provide an intuitive and easily understood interface to control the functions or operations of any of these and other devices.

It should be appreciated that the foregoing related to a description of certain exemplary embodiments. Modifications and variations to the exemplary embodiments may become apparent to those skilled in the art. It should also be appreciated that many features and aspects of the present invention are described above by way of example only and are therefore not to be interpreted as required or essential elements of the invention, unless so stated. Accordingly, the scope of the present invention scope is to be defined only by the following claims and not by the foregoing description of exemplary embodiments.

I claim:

1. A touch panel display screen comprising:
   a display screen for displaying information;
   a plurality of emitters positioned in proximity to the display screen, each of the emitters adapted for emitting energy beams that are diverged across a surface of the display screen according to a cycle; and
   a plurality of detectors positioned in proximity to the display screen and adapted to receive the energy beams over a range of angles and to generate detection signals upon detecting any one of the energy beams, wherein the number of detectors is less than the number of emitters, such that not every emitter is aligned on-axis with a corresponding detector.

2. The touch panel display screen of claim 1, wherein the plurality of emitters are positioned in proximity to the display screen in such a manner that the energy beams cover substantially the entire area of the surface of the display screen.

3. The touch panel display screen of claim 1, wherein the energy beams are selected from the group consisting of infrared energy beams, visible light energy beams, microwave energy beams and acoustic wave energy beams.

4. The touch panel display screen of claim 1, wherein the information displayed on the display screen comprises a dynamically changeable image.

5. The touch panel display screen of claim 1, wherein the information displayed on the display screen comprises a static image.

6. The touch panel display screen of claim 1, wherein a touch of the display screen will interrupt at least one of the energy beams and will cause at least one of the detectors to not detect the at least one interrupted energy beam.

7. The touch panel display screen of claim 6, wherein location of the touch on the display screen is calculated based on the interrupted energy beams.

8. The touch panel display screen of claim 1, wherein the display screen comprises a top edge, a left edge, a right edge and a bottom edge; and
   wherein the plurality of emitters positioned in proximity to the display screen comprises a first set of emitters positioned relative to the top side of the display screen, a second set of emitters positioned relative to the left side of the display screen, a third set of emitters positioned relative to the right side of the display screen, and a fourth set of emitters positioned relative to the bottom side of the display screen.

9. The touch panel display screen of claim 8, wherein the plurality of detectors positioned in proximity to the display screen comprises a first set of detectors positioned relative to the top side of the display screen, a second set of detectors positioned relative to the left side of the display screen, a third set of detectors positioned relative to the right side of the display screen, and a first set of detectors positioned relative to the bottom side of the display screen.

10. The touch panel display screen of claim 9, wherein each set of detectors comprises two detectors.

11. A touch panel display system comprising:
a display screen for displaying information;
a plurality of emitters positioned in proximity to the display screen, each of the emitters adapted for emitting energy beams that are diverged across a surface of the display screen;
a plurality of detectors position in proximity to the display screen, each of the detectors adapted to receive the energy beams over a range of angles and to generate detection signals upon detecting any one of the energy beams;
a computer-readable medium for storing detection maps indicating which of the detectors should be receiving one of the energy beams from at least one of the emitters at any point in time; and
a processor for executing computer-executable instructions for:
generating a plurality of detection maps based on the detection signals generated by the detectors over time and storing the plurality of detection maps on the computer-readable medium,
accessing the computer-readable medium to compare a current detection map to a reference detection map in order to determine the absence of at least one expected detection signal from at least one of the detectors,
based on the absence of the at least one expected detection signal, determining that at least one of the energy beams has been interrupted by a touch of the display screen, and
based on the at least one interrupted energy beam, determining the location of the touch on the display screen.

12. The touch panel display screen of claim 11, wherein the processor executes further computer executable instructions for controlling activation of the emitters.

13. The touch panel display screen of claim 12, wherein the processor controls the emitters to emit energy beams in a cycle such that each emitter is activated and deactivated according to a sequence.

14. The touch panel display screen of claim 13, wherein the cycle is rapid enough to substantially ensure that a plurality of energy beams will be interrupted by a touch of the display screen, each of the interrupted energy beams being emitted by different ones of the emitters at different times.

15. The touch panel display system of claim 11, wherein the reference detection map comprises an average of several previously stored detection maps.

16. The touch panel display system of claim 11, wherein at least two pairs of intersecting energy beams are interrupted by the touch of the display screen; and
wherein determining the location of the touch on the display screen comprises:
determining an intersection point location for each pair of intersecting interrupted energy beams, each intersection point location representing a possible location of the touch on the display screen, and
calculating an average intersection point location by averaging the intersection point locations, the average intersection point location representing an estimation of the location of the touch on the display screen.

17. The touch panel display system of claim 16, wherein determining the location of the touch on the display screen further comprises determining an angle of intersection for each pair of intersecting interrupted energy beams; and
wherein calculating the average intersection point location comprises weighting each intersection point location based on the corresponding angle of intersection and averaging the weighted intersection point locations.

18. A method for implementing a touch panel display screen comprising:
providing a display screen for displaying information;
providing a plurality of emitters positioned in proximity to the display screen, each of the emitters adapted for emitting energy beams that are diverged across a surface of the display screen according to a cycle; and
providing a plurality of detectors positioned in proximity to the display screen and adapted to receive the energy beams over a range of angles and to generate detection signals upon detecting any one of the energy beams, wherein the number of detectors is less than the number of emitters, such that not every emitter is aligned on-axis with a corresponding detector.

19. A computer-readable medium having stored thereon computer-executable instructions for performing the method of claim 18.

20. The method of claim 18, wherein the plurality of emitters are positioned in proximity to the display screen in such a manner that the energy beams cover substantially the entire area of the surface of the display screen.

21. The method of claim 18, wherein a touch of the display screen will interrupt at least one of the energy beams and will cause at least one of the detectors to not detect the at least one interrupted energy beam.

22. The method of claim 21, further comprising determining a location of the touch on the display screen based on the interrupted energy beams.

23. The method of claim 22, wherein at least two pairs of intersecting energy beams are interrupted by the touch of the display screen; and
wherein determining the location of the touch on the display screen comprises:
determining an intersection point location for each pair of intersecting interrupted energy beams, each intersection point location representing a possible location of touch on the display screen, and
calculating an average intersection point location by averaging the intersection point locations, the average intersection point location representing an estimation of the location of the touch on the display screen.

24. A computer-readable medium having stored thereon computer executable instructions for performing the method of claim 23.

25. The method of claim 23, wherein determining the location of the touch on the display screen further comprises determining an angle of intersection for each pair of intersecting interrupted energy beams; and
wherein calculating the average intersection point location comprises weighting each intersection point location based on the corresponding angle of intersection and averaging the weighed intersection point locations.

26. A computer-readable medium having stored thereon computer-executable instructions for performing the method of claim 25.

27. The method of claim 18, wherein the cycle is rapid enough to substantially ensure that a plurality of energy beams will be interrupted by a touch of the display screen, each of the interrupted energy beams being emitted by different ones of the emitters at different times.

28. The method of claim 18, further comprising generating a plurality of detection maps based on the detection signals generated by the at least one detector over time, the detection maps indicating from which of the emitters the at least one detector should receive an energy beam at any point in time.

29. The method of claim 28, further comprising comparing a current detection map to a previously stored detection map in order to determine that at least one of the energy beams has been interrupted by the touch of the display screen.

30. A computer-readable medium having stored thereon computer-executable instructions for performing the method of claim 29.

31. A method for implementing a touch panel display screen comprising:

providing a display screen for displaying information;

providing a plurality of emitters positioned in proximity to the display screen in such manner that ht energy beams cover substantially the entire area of a surface of the display screen, each of the emitters adapted for emitting energy beams that are diverged across the surface of the display screen, the emitters being further adapted to be activated and deactivated according to a sequence that is rapid enough to substantially ensure that a plurality of the energy beams will be interrupted by a touch of the display screen, each of the interrupted energy beams being emitted by different ones of the emitters at different times;

providing a plurality of detectors positioned in proximity to the display screen and adapted to receive the energy beams over a range of angles and to generate detection signals upon detecting any one of the energy beams;

generating a plurality of detection maps based on the detection signals generated by the detectors over time, the detection maps indicating from which of the emitters each of the detectors should receive one of the energy beam at any point in time;

comparing a current detection map to a previously stored detection map in order to determine that the plurality of energy beams has been interrupted by touch of the display screen; and determining a location of the touch on the display screen based on the interrupted energy beams.

32. A computer-readable medium having stored thereon computer-executable instructions for performing the method of claim 31.

33. The method of claim 31, wherein at least two pairs of intersecting energy beams are interrupted by the touch of the display screen; and wherein determining the location of the touch on the display screen comprises;

determining an intersection point location for each pair of intersecting interrupted energy beams, each intersection point location representing a possible location of the touch on the display screen, and calculating an average intersection point location by averaging the intersection point locations, the average intersection point location representing an estimation of the location of the touch on the display screen.

34. A computer-readable medium stored thereon computer-executable instructions for performing the method of claim 33.

35. The method of claim 33, wherein determining the location of the touch on the display screen further comprises determining an angle of intersection for each pair of intersecting interrupted energy beams; and wherein calculating the average intersection point location comprises weighting each intersection point location based on the corresponding angle of intersection and averaging the weighted intersection point locations.

36. A computer-readable medium having stored thereon computer-executable instructions for performing the method of claim 35.

37. A touch panel display screen comprising:

a display screen for displaying information;

a plurality of emitters positioned in proximity to a top edge, a right edge, a left edge and a bottom edge of the display screen, each of the emitters adapted for emitting energy beams that are diverged across a surface of the display screen according to a cycle; and a plurality of detectors interspersed among the emitters along each of the top edge, the right edge, the left edge and the bottom edge of the display screen, each of the detectors adapted to receive the energy beams over a range of angles and to generate detection signals upon detecting any one of the energy beams, wherein the number of detectors is less than the number of emitters, such that not every emitter is aligned on-axis with a corresponding detector.

38. The touch panel display screen of claim 37, wherein the plurality of detectors comprises two detectors interspersed among the emitters along each of the of the top edge, the right edge, the left edge and the bottom edge of the display screen.

39. The touch panel display screen of claim 37, wherein the plurality of detectors comprises three detectors interspersed among the emitters along each of the of the top edge, the right edge, the left edge and the bottom edge of the display screen.

* * * * *